United States Patent [19]

Moosberg

[11] 4,168,041
[45] Sep. 18, 1979

[54] FLY FISHING REEL

[75] Inventor: Börje S. Moosberg, Mörrum, Sweden

[73] Assignee: Abu Aktiebolag, Svangsta, Sweden

[21] Appl. No.: 813,390

[22] Filed: Jul. 6, 1977

[30] Foreign Application Priority Data

Jul. 6, 1976 [SE] Sweden .............................. 7607709

[51] Int. Cl.² ........................................... A01K 89/02
[52] U.S. Cl. ........................................... 242/84.51 R
[58] Field of Search ............... 242/84.51 R, 84.51 A, 242/84.5 R, 219, 211, 212; 192/12 B, 14, 19; 116/115; 74/578; 403/367, 368

[56] References Cited
U.S. PATENT DOCUMENTS

| 2,180,566 | 11/1939 | Thompson | 242/84.51 R |
| 2,993,660 | 7/1961 | Parks | 242/84.51 R |
| 3,478,978 | 11/1969 | Nurmse | 242/84.51 R |
| 3,603,524 | 9/1971 | Nurmse | 242/84.5 R |
| 3,697,012 | 10/1972 | Walker | 242/84.51 R |
| 3,989,204 | 11/1976 | Lemery | 242/84.5 R |

Primary Examiner—Billy S. Taylor
Attorney, Agent, or Firm—Karl W. Flocks

[57] ABSTRACT

A fly fishing reel with a means on the shaft of the line spool between the brake disc and the clutch member, said means cooperating with the brake disc and clutch member in such a way during line pull-out and line retrieval that a click signal is produced during the rotation of the spool as the line is being pulled out but no signal appears during retrieval of the line and optionally a snapping signal is generated when the spool is driven by line pull-out.

6 Claims, 9 Drawing Figures

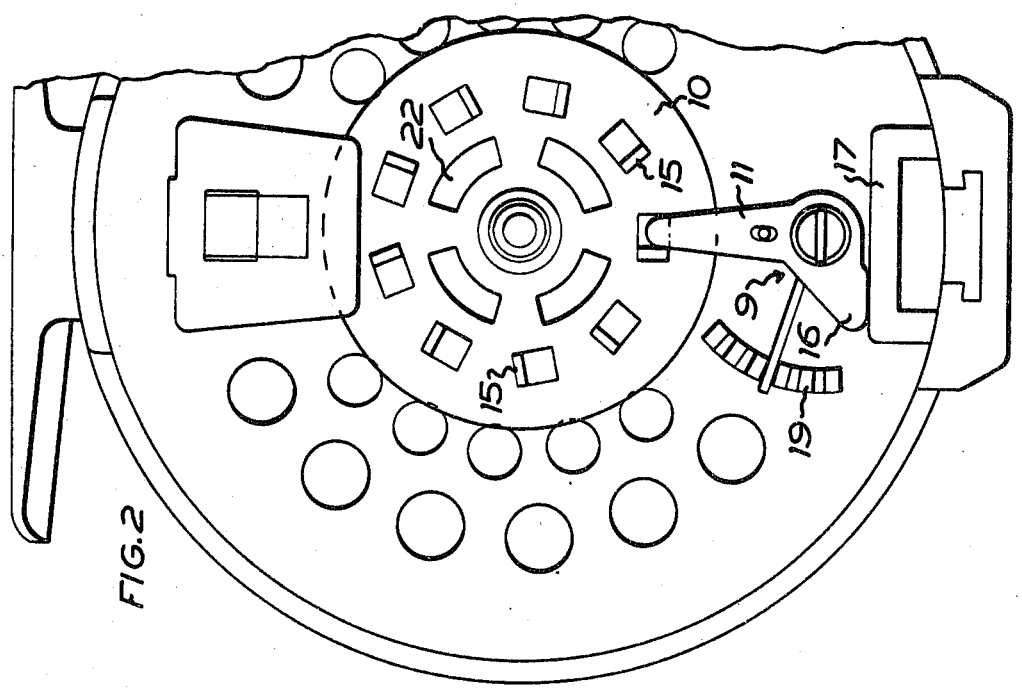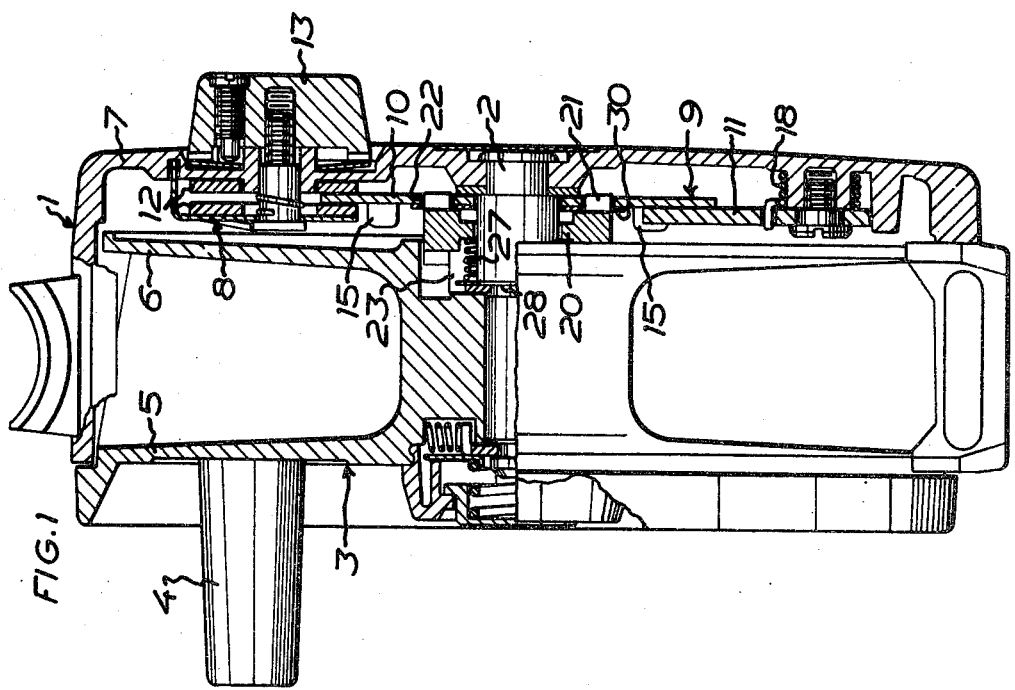

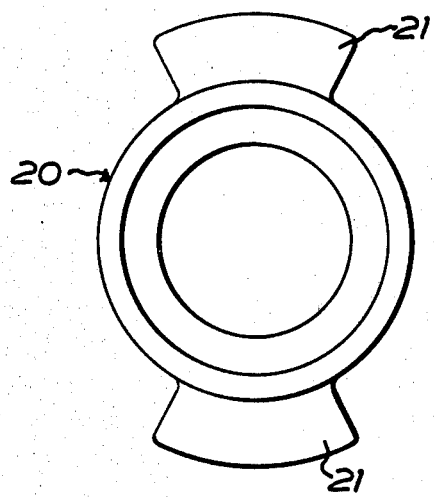
FIG.3
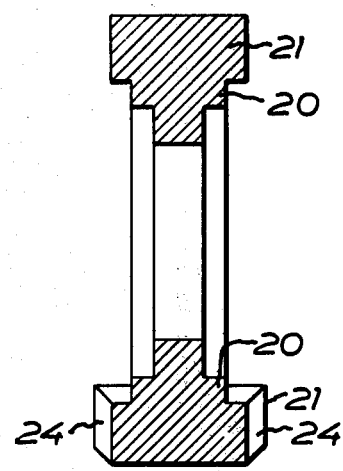
FIG.5
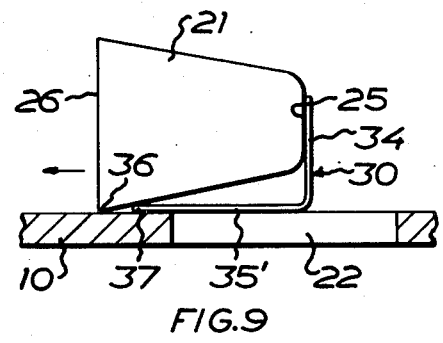
FIG.4
FIG.9

FLY FISHING REEL

The present invention relates to fly fishing reels and, more particularly, to a fly fishing reel equipped with a brake, comprising a brake disc rotatably mounted on the shaft of the line spool and adapted to be driven by the spool on rotation thereof in a first direction by means of a clutch member which is driven by the spool, is axially movable and rotatably mounted on the shaft and has at least one protrusion which, on rotation of the spool and the clutch member in said first direction, is drivingly engaged with a corresponding aperture or equivalent recesses in the brake disc, but is adapted on rotation of the spool and the clutch member in a second, opposite direction to slide into or out of engagement with said aperture, without drivingly engaging the disc, by effecting an axially reciprocatory movement on the shaft, while normally producing an audible sound.

Conventional fly fishing reels often have both a click signaling device and a brake comprising an element which is rotatably mounted on the shaft of the spool and forms both the rotary member of the brake and the ratchet wheel in a ratchet/pawl mechanism included in the click signaling device. The element common to the brake and click signaling devices is mounted on the shaft and is driven, optionally against the action of the adjustable brake, by means of the spool via a clutch in one direction when the spool is rotated as the line is pulled out. In this direction of rotation also the click signaling device is operative. In the opposite direction of rotation of the spool the clutch escapes driving engagement with said element and the click signaling device is inoperative but in this direction of rotation the clutch slides with a snapping motion against the element common to the brake and click signaling devices while producing a snapping sound similar to a click signal. This means that the sound of a characteristic click signal is heard when the spool is rotated by the line being pulled out and another characteristic click or snapping signal when the spool is driven by means of the crank.

Many anglers consider it advantageous to hear the click and snapping signals during the rotation of the spool in opposite directions while others are only disturbed by the sound of the snapping signal during reeling-in of the spool.

The object of the present invention is to provide a fly fishing reel which produces a click signal during the rotation of the spool as the line is being pulled out, but is silent during retrieval of the line.

Another object is to create a fly fishing reel of the same type which can be readily modified so as to provide also a snapping signal when the spool is driven by the pull-out of the line.

To this end the fly fishing reel of this invention comprises a sliding-surface washer fitted on the shaft of the line spool between the brake disc and the clutch member, said washer having at least one sliding and supporting surface for the protrusion of the clutch member and at least one recess permitting the protrusion of the clutch member to engage said aperture in the brake disc, and an abutment, wherein said clutch member and said washer are adapted, on the one hand, on rotation of said clutch member in said second direction of rotation to permit movement of said clutch member relative to said washer so that the protrusion of said clutch member will be positioned on the sliding and supporting surface of said washer while bearing against said abutment to entrain said washer by means of said abutment during the further rotational movement of said clutch member in said second direction of rotation, said clutch member being continuously supported by said washer during said rotational movement, thereby preventing axial movement of said clutch member into engagement with said aperture in said brake disc and consequently the noise produced thereby, and, on the other hand, on rotational movement in said first direction, to permit a sliding movement of the protrusion of said clutch member away from the sliding and supporting surface and from said abutment to said recess in said washer, thus allowing said clutch member to move via said recess into normal driving engagement with said aperture in said brake disc to enable rotation thereof.

The invention will be described in greater detail hereinbelow with reference to the accompanying drawings, in which:

FIG. 1 is a substantially axial sectional view of the fly fishing reel according to this invention;

FIG. 2 is a view of the reel frame seen from the inside to illustrate the invention;

FIGS. 3, 4 and 5 are a plan view, a side view and a cross-sectional view of the clutch member, respectively;

FIG. 9 is a schematic view illustrating the cooperation of the clutch member, the sliding-surface washer and the brake disc/ratchet wheel.

Figure 8:
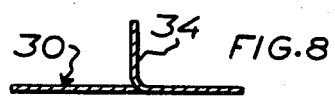
FIG. 8 is a sectional view of the sliding-surface washer on the line VIII—VIII in FIG. 6.

The fly fishing reel shown in FIGS. 1 and 2 comprises a frame 1 including a cantilever shaft 2 on which the line spool 3 is mounted. The line spool is driven in the usual manner by means of a crank 4, secured to one end wall 5 of the spool which is also one end wall of the reel. The opposite spool end wall 6 defines, relative to a frame wall 7, a circular enclosed space in which there are arranged a disk type brake 8 and a click signaling device 9. The click signaling device 9 includes a ratchet/pawl mechanism 10, 11 the ratchet wheel of which also constitutes the disc 10 of the disc brake.

The description of the fly fishing reel proper is so far to be regarded as general information of a per se known construction and it is to be understood that the invention is not confined to the detail design of the fly fishing reel proper.

The brake includes, for cooperation with the disc 10, two brake shoes 12 bearing against opposite sides of the disc 10 close to the periphery of the disc. These brake shoes are mounted on the frame wall 7 and can be drawn together by means of a regulating member 13 in the form of a handwheel mounted on the outside of the frame wall 7 to increase the braking action exerted on the disc from a minimum value, for instance equal to zero, to a chosen maximum value.

The disc 10 has inside the brake shoes 12 a circular row of protrusions 15 which act as ratchet teeth for cooperation with the pawl 11 which is pivotally mounted on the frame wall 7 in a diametrical position relative to the brake shoes. The pawl has a projection 16 extending angularly relative to the longitudinal axis of the pawl. Said projection is in the form of a small hammer which cooperates for click signal production with an anvil 17 supported by the frame at the inside of the frame wall 7. Arranged between the pawl 11 and the frame wall 7 is a spring 18 tending to maintain the pawl in a position in which the hammer 16 is applied to the anvil 17. In the illustrated embodiment the longitudinal axis of the pawl in this position generally coincides with a diameter of the brake disc. The spring 18 is adjustable in that a projecting spring arm can be placed in an optionally chosen gap between a series of projections 19 inwardly directed from the inside of the frame wall 7.

Arranged on the shaft 2 between the spool 3 and the brake disc 10 is an annular clutch member 20 having two diametrical sector-shaped protrusions 21 and the configuration of which is best seen in FIGS. 3–5. The brake disc 10 has near its inner periphery four equiangularly spaced sector-shaped apertures 22 which are shaped and dimensioned to receive the protrusions 21 of the clutch ring 20. At the adjacent side of the hub the spool 3 has a recess 23 including a pair of diametrical enlargements of the same form as the protrusions of the clutch ring. The recess 23 has a sufficient depth to receive an adjacent portion of the clutch ring 20 and its protrusions 21 in clutching engagement with the spool.

According to the conventional design of the mechanism described above the protrusions 21 of the clutch ring 20 have oblique surfaces 24 at the side facing the brake disc 10 and these surfaces are inclined relative to the brake disc 10 (said disc is outlined in FIG. 4). When the clutch ring is engaged with the brake disc 10 those surfaces 24 of the clutch ring protrusions which face the disc are countersunk in the apertures 22 of the brake disc 10 except at the front ends 25 of the protrusions 21 where these surfaces 24 are positioned axially outwardly of the adjacent side of the brake disc 10. When the clutch ring 20 rotatably and movably mounted on the shaft 2 is turned in the direction of the front ends 25 of the protrusions 21 it will thus slide onto the disc so that the ring can be rotated relative to the brake disc 10 without engaging it. When the clutch ring 20 is turned in the opposite direction the rear ends 26 of the protrusions 21 fall into the apertures 22 and engage the brake disc 10 because the axial width of the rear projection ends 26 is larger than that of the front ends 25 and the ring 20 itself is narrower than the front ends 25, as is clearly apparent from FIG. 4.

To permit the clutch ring 20, after it has been displaced in axially inward direction away from the brake disc 10 by rotation in one direction, to be brought back into engagement with the brake disc apertures 22 by rotation in the other direction, the clutch ring is biased by means of a spring 27 which is arranged on the shaft 2 between the clutch ring and a C-shaped locking ring 28 fitted in a groove on the shaft 2.

In a conventional embodiment this arrangement operates as follows.

When the spool 3 is driven by means of the crank 4 for retrieval of the line the clutch ring 20 slides, while being slightly displaced in axial direction, onto the brake disc 10 and thereupon falls down with its protrusions 21 into the next pair of two axially positioned apertures 22 in the brake disc, etc.

Thus, in this direction of rotation, the brake disc 10 is disengaged from the clutch ring 20 but because the clutch ring protrusions 21, each time they pass two diametrical apertures 22 in the brake disc, fall into said apertures, (the clutch ring effects an axial snapping movement), there is produced a snap or click signal making a characteristic sound (which is dependent on the construction) when the spool is rotated by means of the crank. The brake disc 10 cannot be rotated in this direction because, on the one hand, it is disengaged from the clutch ring and, on the other hand, the pawl 11 prevents such rotational movement as the hammer 16 bears against the anvil 17 and the pawl engages the projections or teeth 15 of the brake disc/pawl 10. However, when the spool rotates in the opposite direction, for instance by pulling out the line, the protrusions 21 of the clutch ring 20 fall into engagement with the apertures 22 of the brake disc and drive the brake disc against the action of the brake shoes 12 (if the brake is set to produce braking action). Due to the rotation of the brake disc 10 the pawl 11 is swung by each tooth 15 in clockwise direction and is returned by its spring in anti-clockwise direction when the pawl has passed the tooth, and every time the hammer strikes against the anvil there is produced a characteristic click signal at a frequency which is dependent on the rotational speed of the spool.

The last-mentioned click signal is desirable but the first-mentioned signal is often considered unnecessary and disturbing.

Figure 6:
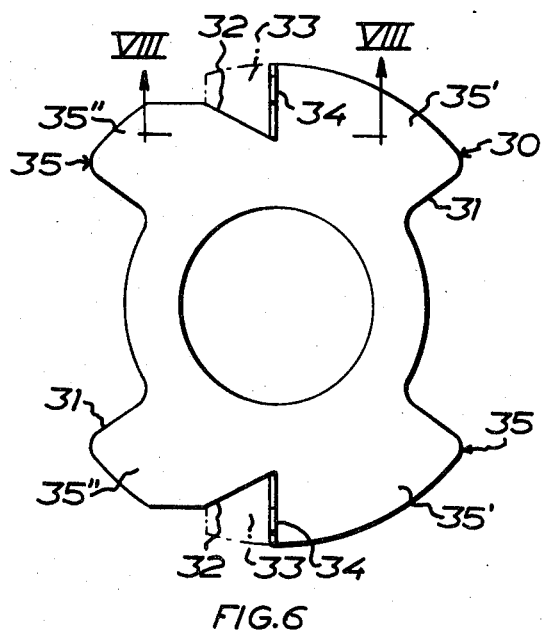
FIGS. 6 and 7 are a plan view and a side view of a sliding-surface washer, respectively.
Figure 7:
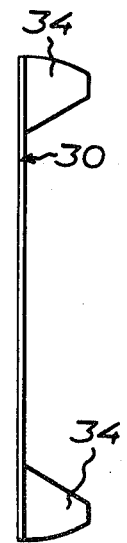

To make the line spool 3 silent-running during retrieval of the line a thin sliding-surface washer 30 according to the invention is fitted on the shaft 2 between the clutch ring 20 and the brake disc 10. In a preferred embodiment the slide washer 30 (the construction thereof is shown in detail in FIGS. 6–8) has such a radius that the outer edge of the washer is situated in a zone between the teeth or projections 15 and the apertures 22 of the brake disc 10. The washer 30 is provided with two diametrical recesses 31 the width of which in circumferential direction is greater than that of each of the apertures 22 in the brake disc 10 and the washer also has two triangular recesses 32 which are formed by punching oblique slits in the washer and bending out triangular portions 33, which are indicated by dash lines in FIG. 6, to provide tongues 34 at right angles from the washer. The two diametrical sector-shaped outer edge portions 35 of the washer 30 between the two diametrical recesses 31 are divided by the triangular recesses 32 into four projecting portions 35', 35", of which two projection portions 35' are separated by a recess 31 and each have one tongue 34 at the edges opposite to said recess. The two other projection portions 35" are separated from one another by the other recess 31 and from the adjacent projecting portions 35' by the triangular recesses 32. Each projecting portion 35', 35" can form a seat for a protrusion 21 of the clutch ring 20 to prevent introduction of the protrusion of the clutch ring into engagement with the clutch aperture 22 of the brake disc 10. After the clutch ring 20 has been turned relative to the washer 30 so that the clutch ring protrusions 21 will be positioned opposite to the recesses 31, the clutch ring may be axially displaced by means of its biasing spring 27 so that the projections 21 will move into engagement with the apertures in the brake disc 10.

This arrangement operates as follows.

When the spool 3 is rotated by means of the crank 4 for retrieval of the line the clutch ring 20 slides easily onto the washer 30 (due to the aforementioned configuration of the sides 24 of the protrusions 21 facing the brake disc 10) and places itself with one of the protrusions 21 resting on a washer portion 35" and with the other protrusion resting on a substantially diametrically positioned washer portion 35' in application with the corresponding tongue 34 which forms an entraining abutment whereupon the clutch ring carries the washer 30 along during its rotation. When passing over the apertures 22 in the brake disc 10 the clutch ring protrusions 21 will then be prevented from effecting the aforementioned snapping movement into the apertures 22. The sliding-surface washer 30, which supports the clutch ring 20 during the rotation thereof in this direction, slides silently on the disc 10. In other words, the spool is silent-running in the direction of rotation for retrieval of the line.

When the spool is rotated in the opposite direction (by a pull at the line) the clutch ring 20 is driven in such a direction that its protrusions 21 move in the direction towards the recesses 31 in the slide washer 30 and when the protrusions 21 reach the recesses 31 the clutch ring is pushed by its spring into engagement with the apertures 22 in the brake disc 10. The mechanism then functions in the conventional manner, i.e. the spool 3 drives the brake disc 10 via the clutch ring 20, while the click signaling device 9 is in operation.

If it is desired that the mechanism should operate in the previously known manner one only has to disassemble the spool (which can be done by a simple manipulation), whereupon the locking ring 28 is temporarily removed together with the spring 27 and the clutch ring 20; after that the sliding-surface washer 30 is removed and the other dismounted elements are put back in their proper position.

To permit the mechanism to function in the manner described above also in the case of fly fishing reels intended for use by left-handed persons, the clutch ring 20 is designed so that it can be turned around completely on the shaft 22 and to operate in the intended manner although the spool rotates in the opposite direction when the line is being reeled in or is running out. The configuration described above of the sliding-surface washer 30 with its two tongues 34 and two pairs of diametrical projections 35', 35" allows this "left-handed function"; and it would otherwise be possible to give the washer a simpler form.

Although the sliding-surface washer 30 is thin it may be desirable to form the protrusions 21 of the clutch ring 20 so that they will easily slide onto the washer 30 without resistance. As shown in FIG. 9 the surfaces 24 of the protrusions 21 are inclined and the edges at the front ends 25 may be rounded off. The function appears from FIG. 9, showing a protrusion 21 and portions of the sliding-surface washer 30 and the brake disc 10.

It can never happen that the slide washer 30 is entrained in the direction of line pull-out. If during rotation of the ring 20 the protrusion 21 moves in the direction indicated by an arrow in FIG. 9, the surface 24 will immediately leave the washer portion 35'. In the preferred embodiment the corner of the protrusion 21 designated 36 in FIG. 9 should barely rest against the disc 10 and the surface 24 should not or barely rest against the edge 37 of the washer projection 35' when the front surface 25 of the clutch ring protrusion 21 bears against the tongue 34. This dimensioning is the preferred one but minor deviations may be tolerated without abolishing the function.

What I claim and desire to secure by Letters Patent is:
1. A fly fishing reel comprising
   a frame;
   a shaft supported by said frame;
   a line spool rotatably mounted on said shaft;
   braking means including
      a brake disc rotatably mounted on said shaft on one side of and spaced from said line spool, and having recesses therein,
      and brake shoe means for adjustable braking engagement with said brake disc;
   a clutch member mounted for axial and rotatable movement on said shaft in the space between said brake disc and said spool and having at least one protrusion thereon;
   means operatively connected with said clutch member to axially reciprocate said clutch member toward said brake disc into operative engagement therewith and away from said brake disc, and means to operatively engage said clutch member with said spool;
   a sliding surface washer mounted rotatably on said shaft between said brake disc and said clutch member and including
      at least one surface providing a sliding and supporting surface for said at least one protrusion of said clutch member,
      at least one abutment extending outward from the plane of said washer,
      and at least one recess in said washer permitting said at least one protrusion of said clutch member to project therethrough into one of said recesses in said brake disc to drivingly engage said brake disc by said clutch member upon movement of said clutch member axially toward said brake disc by said means to axially reciprocate said clutch member when said spool rotates said clutch member and brake disc in one direction, and upon rotation of said spool and said clutch member in a second, opposite direction, said clutch member is moved relative to said washer to a position in which said protrusion is moved in relation to said washer, by said spool and said means to axially reciprocate said clutch member, into a position in which said protrusion abuts said abutment of said washer for entraining said washer, said supporting surface of said washer in said abutment position of said protrusion supporting said protrusion in a degree sufficient to prevent axial movement of said clutch member into driving engagement with said brake disc recesses
   thereby permitting relatively silent rotation of said line spool and said clutch member in said second direction with said clutch member riding on said supporting surface of said washer.

2. A fly fishing reel as claimed in claim 1, wherein the thickness of said sliding-surface washer is substantially smaller than that of said brake disc.

3. A fly fishing reel as claimed in claim 2, wherein the protrusion of said clutch member is sector-shaped and its side facing said brake disc forms an angle with the plane of said brake disc, the sliding and supporting surface of said washer having such an extent in the circumferential direction of said washer in relation to the extent of the protrusion in the circumferential direction that the protrusion, when its front end bears against said abutment of said washer, extends with its opposite end a small distance outwards from said sliding and supporting surface but at most so far that the transition between the latter end of said protrusion and the side of the protrusion facing said brake disc will barely touch said brake disc or go entirely clear of it when said protrusion bears against said abutment of said washer, (FIG. 9).

4. A fly fishing reel as claimed in claim 1, in which said clutch member is in the form of a ring having two diametrically positioned sector-shaped protrusions which are shaped so that said ring can be mounted on said shaft in opposite axial positions to permit equivalent function of the fly fishing reel both for left-hand and right-hand operation, wherein said sliding-surface washer has two generally diametrical abutments and at least two sliding and supporting surfaces which are adapted to act alternatively for right-hand and left-hand operation of the fly fishing reel.

5. A fly fishing reel as claimed in claim 1, further including a pawl means and wherein said brake disc also constitutes the ratchet wheel of a ratchet/pawl mechanism in that said brake disc has a circular row of projections positioned radially outwardly of a circular row of said recesses and adapted to cooperate as teeth with said pawl means, said pawl means including a pawl, and said washer has a maximum diameter which is less than the inner diameter of said circular row of projections.

6. A fly fishing reel as claimed in claim 5, wherein said pawl, pivotally mounted on a shaft, is in the form of a bellcrank one arm of which constitutes the pawl proper and the other arm of which forms a small hammer for cooperation with an anvil supported on the reel frame, and including means for return movement of said pawl with said hammer and said anvil forming, on the one hand, a signaling device for sound protection on rotation of the disc in a direction corresponding to line pull-out and, on the other hand, forming a stop means to prevent rotation of said brake disc in the opposite direction.

* * * * *